June 2, 1964     T. B. DALTON     3,135,135
REDUCTION GEAR CRANK FOR SEMI-TRAILER LANDING
GEAR LEGS AND THE LIKE Filed March 5, 1962     2 Sheets-Sheet 1

INVENTOR.
THOMAS B. DALTON
BY
Barnes, Kisselle, Raisch &
Choate
ATTORNEYS

June 2, 1964
T. B. DALTON
3,135,135
REDUCTION GEAR CRANK FOR SEMI-TRAILER LANDING
GEAR LEGS AND THE LIKE
Filed March 5, 1962
2 Sheets-Sheet 2
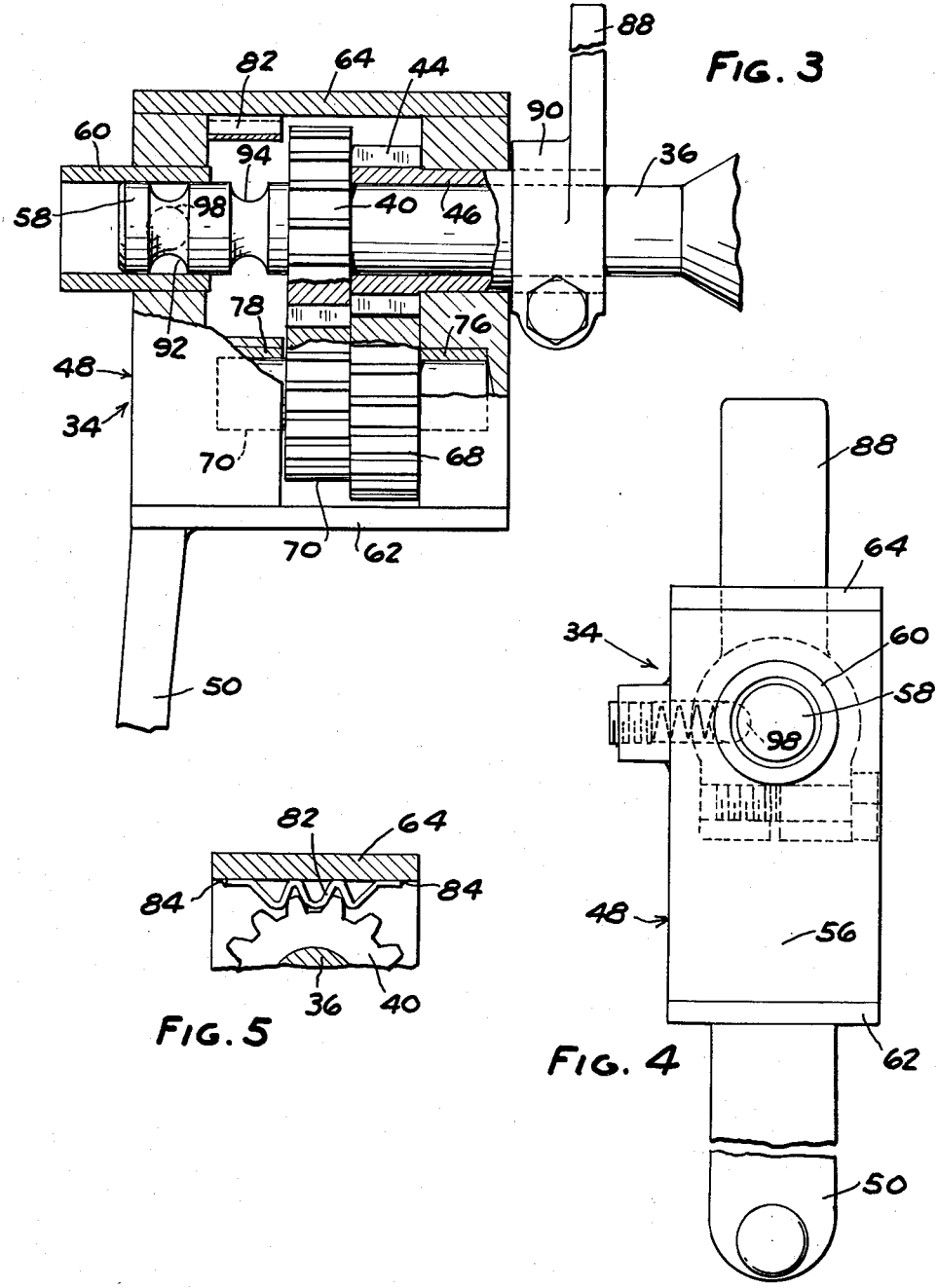
INVENTOR.
THOMAS B. DALTON
BY Barnes, Kisselle, Raisch & Choate
ATTORNEYS United States Patent Office 3,135,135
Patented June 2, 1964

3,135,135
REDUCTION GEAR CRANK FOR SEMI-TRAILER LANDING GEAR LEGS AND THE LIKE
Thomas B. Dalton, Muskegon, Mich., assignor to West Michigan Steel Foundry Co., Muskegon, Mich., a corporation of Michigan
Filed Mar. 5, 1962, Ser. No. 177,656
7 Claims. (Cl. 74—781)

Semi-trailer landing gear legs are frequently hand cranked between their downward load-bearing position and their upward retracted position. It is customary to incorporate a gearbox in the shafting which operates the legs to provide a low gear for extending the legs in loaded condition and a high gear for rapid operation when the legs are not loaded. This materially increases the cost and complexity of the landing gear.

The object of this invention is to provide a combination hand crank and gearbox structure which is relatively simple and inexpensive and which facilitates simplified, less costly landing gear construction by eliminating the necessity for a built-in gearbox.

The invention generally contemplates a crank having a gear housing interposed between the handle and shaft. The housing and shaft are provided with a planetary gearing arrangement through which the shaft can be turned in low gear by the handle. The housing is axially shiftable on the shaft to disengage the planetary gearing and couple the housing to the shaft to provide a direct drive in the manner of a conventional crank. One form of the invention is shown in the accompanying drawings.

FIG. 3 is a view generally similar to FIG. 2 but illustrating the parts in a different position.

FIG. 4 is a partly diagrammatic elevational view of the crank looking toward the right in FIG. 3.

FIG. 5 is a sectional view on line 5—5 of FIG. 2.

Figure 1:
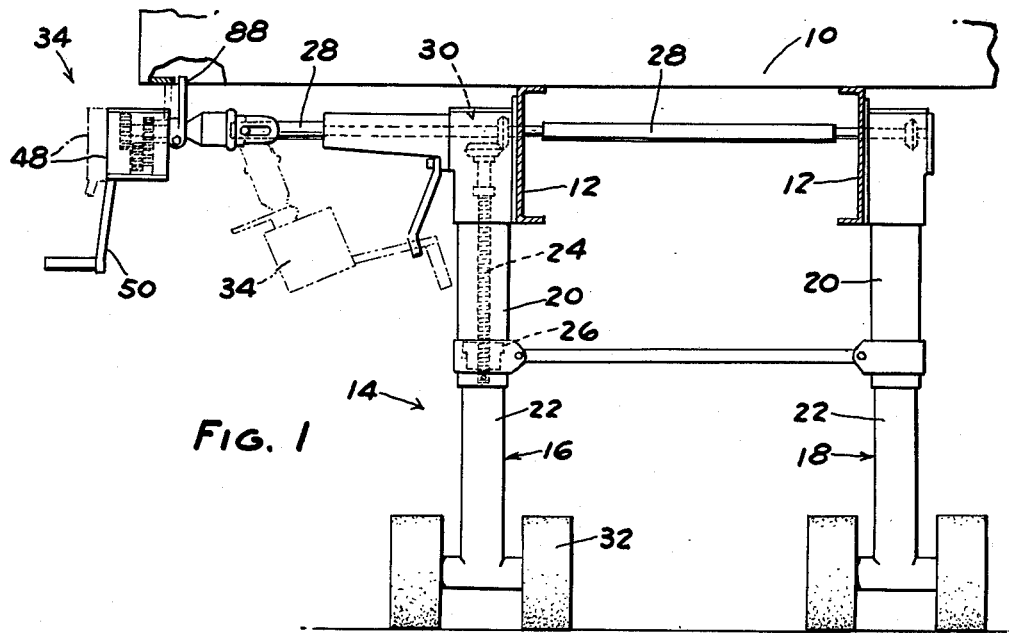
FIG. 1 is a fragmentary generally elevational view of a semi-trailer landing gear utilizing the present invention, parts being shown in section and in phantom to illustrate structure.

Shown in the drawings is a semi-trailer 10 having longitudinal frame members 12 to which landing gear 14 is anchored. The landing gear includes two legs 16 and 18, each having telescoping upper and lower tubes 20, 22 operably interconnected by a jackscrew 24 and nut 26. The jackscrew is operated by a shaft 28 through bevel gearing 30. The landing gear is illustrated in extended condition in FIG. 1 and has ground-engaging rollers 32 or the equivalent at the lower ends of the legs. This much of the landing gear is conventional.

The reduction crank 34 has a shaft 36 adapted to be operatively connected to shaft 28 by a conventional coupling 38. A sun gear 40 is fixed on shaft 36 by a pin 42 or the equivalent, and a second sun gear 44 is rotatably mounted around shaft 36. Gear 44 has a central sleeve extension 46. Gear 44 and sleeve 46 are longitudinally shiftable on shaft 36 for a purpose to be described.

A gear housing 48 is rotatably mounted around shaft 36 and has a laterally projecting handle 50. The housing has an end member 52 with an opening 54 through which sleeve 46 projects so that housing end 52 is journaled on the sleeve. The housing has another end member 56 journaled on an end portion 58 of shaft 36 through a bearing sleeve 60 which is both rotatable and longitudinally slidable with respect to shaft 36 for a purpose to be described. The housing has side walls 62 and 64 which are secured to ends 52 and 56 as by bolting 66.

Housing 48 bodily carries two planet gears 68 and 70; and for this purpose, ends 52 and 56 are provided respectively with recesses 72 and 74 having bearing liners 76 and 78. Gears 68 and 70 are mounted on a shaft 80 whose end portions are journaled in bearings 76 and 78 as shown. These gears are fixed relative to each other so that they rotate together at all times; and for this purpose, they may be secured to each other or fixed on shaft 80 or both. Gear housing wall 64 is provided with means for locking engagement with sun gear 40; and for this purpose is shown as being provided with a gear segment 82 welded to the interior of wall 64 at 84. This gear segment may have the form of a simple corrugated stamping.

Sleeve 46 has an end portion 86 disposed outside of housing 48 and provided with means for anchoring the sleeve and sun gear 44 against rotation with housing 48 during operation. The anchor means illustrated comprises a radial or lateral finger 88 secured to the sleeve by such means as a bolted collar 90. Finger 88 projects laterally for engagement with a stationary object such as a portion of the body of semi-trailer 10 as shown in FIG. 1. Collar 90 also serves to secure sun gear 44 in an axial position spaced from sun gear 40.

Planet gear 68 is at all times engaged with sun gear 44. Sun gear 40 is either engaged with gear segment 82 or planet gear 70, depending on whether housing 48 is shifted to the left relative to shaft 36 as in FIG. 2 or to the right as in FIG. 3. Shaft 36 is provided with two axially spaced grooves 92 and 94, and a spring-pressed ball detent 98 is mounted on housing 48 for engaging in the grooves and thereby yieldably securing housing 48 in the right or left position of FIGS. 2 and 3 respectively.

In use it may be assumed that shaft 36 has been coupled with shaft 28 of the landing gear mechanism and that the landing gear is in an upward retracted position (not shown) in which lower leg tubes 22 are telescoped upwardly into upper leg tubes 20. To lower the legs to the position of FIG. 1, housing 48 is initially shifted to the righthand position of FIG. 2 so that sun gear 40 is disengaged from planet gear 70 and is engaged with gear segment 82. When crank handle 50 is turned, gear housing 48 turns with it and gear segment 82 is carried in a path which is circumferential around the axis of shaft 36 and sun gear 40. Segment 82 carries sun gear 40 with it, and sun gear 40 in turn rotates shaft 36 for lowering leg tubes 22. This provides a direct drive between handle 50 and shaft 36 and facilitates relatively rapid, convenient lowering of the leg tubes.

When wheels 32 contact the ground, the landing gear legs will begin to assume load of trailer 10. At this point, housing 48 is shifted leftward to the position of FIG. 3. Gear segment 82 slidably disengages sun gear 40 which remains stationary while gears 44, 68, and 70 are carried bodily to the left. Planet gear 70 slidably engages sun gear 40.

Then, upon continued turning of handle 50, planet gears 68, 70 will be carried bodily in a planetary path around sun gears 40 and 44. During the initial turning movement, shaft 36 will remain undriven until anchor finger 88 engages a stationary part of the trailer. Thereafter, sun gear 44 is restrained from rotation with gear housing 48. Planet gear 68 revolves and rotates relative to sun gear 44 causing like revolution and rotation of planet gear 70. Gear 70 in turn rotates sun gear 40 and shaft 36 at a rate determined by the overall ratio of gears 44, 68, 70, and 40. In most cases, this ratio will provide for reduction gearing so that the operator can relatively easily turn crank 50 to extend the landing gear legs when they are bearing the load of the trailer.

Figure 2:
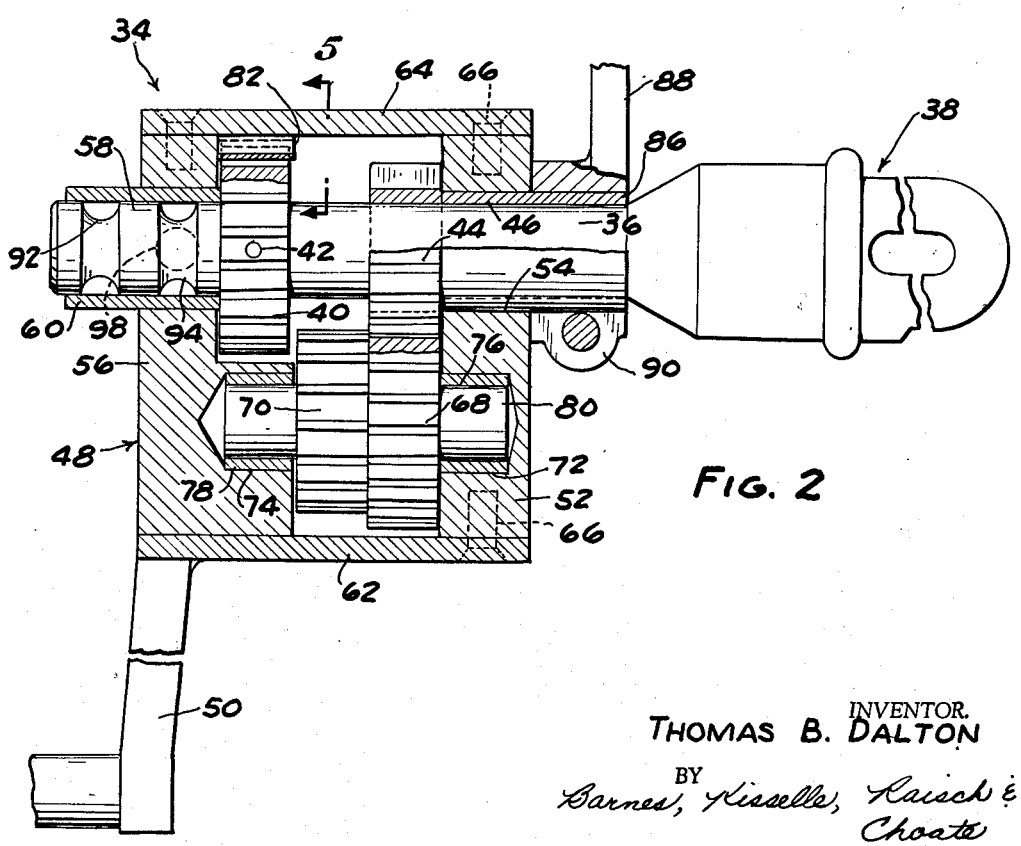
FIG. 2 is a sectional view of the reduction crank with parts broken away for illustrative purposes.

To retract the landing gear, gear housing 48 may be left in the gear drive position of FIG. 3 or again returned to the direct drive position of FIG. 2, depending on the circumstances. In any event, however, either a direct drive or a gear drive may be provided merely by shifting the housing to the left or right.

In an actual model of the invention, sun gear 44 and planet gear 70 have both been provided with 16 teeth. Planet gear 68 and sun gear 40 have both been provided with 20 teeth. This provides a gear ratio of 2.77 to 1: 2.77 turns of handle 50 to 1 turn of shaft 36. In the direct drive position of FIG. 2, a 1 to 1 ratio is provided.

With the present invention, it is unnecessary to provide every semi-trailer landing gear with a built-in gearbox. One reduction crank 34 can serve many trailers. This decreases the overall cost of landing gear and decreases the road weight which is an important factor in all highway vehicles. Moreover, in many cases, elimination of the built-in gearbox greatly simplifies installation problems since the space available for landing gear operating mechanism is frequently very limited.

It is contemplated that the reduction crank will find its greatest usefulness as an accessory stored separate from the trailer except when the landing gear actually has to be operated. In this situation, coupling 38 will be of a readily detachable kind such as a bayonet coupling, pin and socket coupling or the like. In other cases, however, the crank may be permanently secured to the vehicle and swung to one side when not in use as represented in dotted lines in FIG. 1.

I claim:
1. Reduction gear crank for semi-trailer landing gear and the like comprising,
   means providing a shaft adapted to be operably connected with the landing gear or the like,
   means providing a gear housing rotatable and longitudinally shiftable relative to said shaft,
   a first gear rotatable relative to said housing and shaft substantially coaxially with said shaft,
   anchor means operatively connected with said first gear and projecting from said housing for engagement with a stationary object for restraining rotation of said first gear,
   a second gear rotatable on said housing and revolvable therewith in engaged relation about said first gear,
   a third gear in substantially non-rotatable coaxial relation with said second gear,
   a fourth gear substantially fixed on said shaft and about which said third gear is revolvable in engaged relation by rotation of said housing,
   locking means on said housing,
   said locking means and third gear being alternatively engageable and disengageable with said fourth gear responsive to relative longitudinal shifting of said shaft and housing,
   whereby selectively to drive said shaft directly by said housing or through said gearing.
2. Reduction gear crank for semi-trailer landing gear and the like comprising,
   means providing a shaft adapted to be operably connected with the landing gear or the like,
   means providing a gear housing rotatable and longitudinally shiftable relative to said shaft,
   a sun gear rotatable relative to said housing and shaft substantially coaxially with said shaft,
   sun gear anchor means projecting to the exterior of said housing and being adapted to engage a stationary object for restraining rotation of said sun gear,
   another sun gear substantially fixed on said shaft,
   two substantially coaxial planetary gears mounted co-rotatably on said housing, one of which is engaged with said rotatable sun gear and the other of which is positioned for engagement with said fixed sun gear,
   locking means on said housing positioned for engagement with said fixed sun gear,
   said locking means and said other planetary gear being alternatively engageable and disengageable with said fixed sun gear responsive to relative longitudinal shifting of said shaft and housing,
   whereby selectively to drive said shaft directly by said housing or through said gearing.
3. Reduction gear crank for semi-trailer landing gear and the like comprising,
   means providing a shaft adapted to be operably connected with the landing gear or the like,
   means providing a gear housing rotatable and longitudinally shiftable relative to said shaft,
   two sun gears, one of which is substantially fixed relative to said shaft and the other of which is rotatable relative to said shaft and said gear housing,
   anchor means operatively connected with said rotatable sun gear and projecting from said housing for engagement with a stationary object to restrain rotation of said rotatable sun gear,
   means forming planetary gearing carried by said housing and providing a drive connection between said sun gears,
   said gearing including a final gear which is engageable and disengageable with said fixed sun gear responsive to relative longitudinal shifting of said shaft and housing,
   and locking means on said housing engageable and disengageable with said fixed sun gear alternatively with said final gear,
   whereby selectively to drive said shaft directly by said housing or through said gearing.
4. The combination defined in claim 3 wherein said other sun gear is mounted rotatably on said shaft,
   said other sun gear having a sleeve extension surrounding said shaft and projecting to the exterior of said housing,
   said extension providing at least in part said anchor means,
   said housing having portions journaled on said sleeve.
5. The combination defined in claim 4 wherein said sleeve is provided with means forming a laterally extending finger for engagement with a stationary object to restrain rotation of said other sun gear.
6. The combination defined in claim 3 wherein said locking means includes means forming a gear segment mounted on said housing interior,
   said gear segment having portions slidably engageable and disengageable with said fixed sun gear responsive to relative shifting of said shaft and housing.
7. Reduction gear crank for semi-trailer landing gear and the like comprising,
   means providing a shaft adapted to be operably connected with the landing gear or the like,
   two sun gears, one of which is substantially fixed on said shaft and the other of which is rotatable relative to said shaft, said other sun gear having a sleeve extension surrounding said shaft,
   a housing which includes two end members journaled around said shaft and secured in axially spaced relation by means forming the sides of said housing, said sleeve extending to the exterior of said housing and having means adapted to engage a stationary object to restrain rotation of said other sun gear,
a shaft carried by said housing substantially parallel to the first-mentioned shaft,
two substantially coaxial planet gears on the latter-said shaft secured for co-rotation, one of said planet gears being engaged with said other sun gear and the other of said planet gears being positioned for engagement by said fixed sun gear,
locking means on the interior of said housing positioned for engagement by said fixed sun gear,
said fixed sun gear being alternatively engageable with said locking means and said other planet gear responsive to relative longitudinal shifting of said shaft and housing,
whereby selectively to drive the first-mentioned shaft directly by said housing or through said gearing.

No references cited.